United States Patent [19]

Rodrigues

[11] Patent Number: 5,421,879
[45] Date of Patent: Jun. 6, 1995

[54] CEMENT SET RETARDING ADDITIVES, COMPOSITIONS AND METHODS

[75] Inventor: Klein A. Rodrigues, Duncan, Okla.

[73] Assignee: Halliburton Company, Duncan, Okla.

[21] Appl. No.: 242,389

[22] Filed: May 13, 1994

Related U.S. Application Data

[62] Division of Ser. No. 4,325, Jan. 14, 1993, Pat. No. 5,341,881.

[51] Int. Cl.$^6$ ............................................. C04B 24/12
[52] U.S. Cl. ................................... 106/727; 106/808; 106/823; 166/293; 166/294; 405/267
[58] Field of Search .................. 106/727, 808, 823; 166/293, 294; 405/267

[56] References Cited

U.S. PATENT DOCUMENTS

| | | | |
|---|---|---|---|
| 4,500,357 | 2/1985 | Brothers et al. | 166/293 |
| 4,555,269 | 11/1985 | Rao et al. | 166/293 |
| 4,557,763 | 12/1985 | George et al. | 166/293 |
| 4,676,317 | 6/1987 | Fry et al. | 166/293 |
| 4,941,536 | 7/1990 | Brothers et al. | 166/293 |
| 5,092,935 | 3/1992 | Crema et al. | 106/808 |

FOREIGN PATENT DOCUMENTS 91-237045  2/1990  Japan.

*Primary Examiner*—Mark L. Bell
*Assistant Examiner*—Michael Marcheschi
*Attorney, Agent, or Firm*—Robert A. Kent

[57] ABSTRACT

Cement set retarding additives, set retarded hydraulic cement compositions and methods of using the cement compositions for cementing zones in wells are provided. The set retarding additives are copolymers containing monomer units formed from a first monomer of acrylic acid or methacrylic acid and a second monomer of acrylamide or a derivative of acrylamide.

6 Claims, No Drawings

CEMENT SET RETARDING ADDITIVES, COMPOSITIONS AND METHODS

This application is a division of application Ser. No. 08/004,325, filed Jan. 14,1993, now U.S. Pat. No. 5,341,881.

BACKGROUND OF THE INVENTION

1. Field of the Invention

The present invention relates generally to cement set retarding additives, hydraulic cement compositions including the additives and methods of using the set retarded compositions for cementing subterranean zones in wells.

2. Description of the Prior Art

A variety of procedures involving hydraulic cement compositions are utilized in the construction and repair of wells such as oil, gas and water wells. For example, in the completion of a well after a well bore has been drilled into one or more subterranean producing formations, a pipe such as casing is disposed in the well bore and a hydraulic cement composition is pumped into the annular space between the walls of the well bore and the exterior of the pipe. The cement composition is allowed to set in the annular space whereby an annular cement sheath is formed therein which bonds the pipe to the walls of the well bore and prevents the undesirable flow of fluids into and through the annular space.

In repairing producing wells, hydraulic cement compositions are often utilized to plug holes or cracks in the pipe disposed in the well bore; to plug holes, cracks, voids or channels in the aforementioned cement sheath between the pipe and the well bore; to plug permeable zones or fractures in subterranean formations and the like. The holes, cracks, etc. are repaired by forcing hydraulic cement compositions thereinto which harden and form impermeable plugs therein.

High temperatures are frequently encountered in deep subterranean zones to be cemented. The combination of the depth of the zone and the high temperature thereof often results in the requirement that the setting time of the cement composition be extended to allow the cement composition to be pumped into the zone to be cemented. Set retarding additives have been developed and used for this purpose, and such additives have been mixed with well cement compositions in amounts sufficient to delay the setting of the compositions until they can be pumped into desired subterranean locations.

While a variety of set retarding additives have been developed and used successfully heretofore, they can and often do produce erratic results in cement compositions of different component make-up and/or cause premature gelation of cement compositions when they are subjected to the high temperature environments of deep subterranean zones. The high temperatures referred to herein are temperatures of 200° F. and higher, and the gelation referred to is the abnormal increase in viscosity of a cement composition without an increase in compressive strength. The increase in viscosity makes the cement composition difficult or impossible to pump even though the cement composition has not set. In addition, a number of the prior art set retarding additives are comprised of materials which are expensive to produce. Thus, there is a continuing need for improved cement set retarding additives which do not cause premature gelation and which are relatively inexpensive, set retarded hydraulic cement compositions containing the additives and methods of using the compositions for carrying out cementing operations in wells.

SUMMARY OF THE INVENTION

Improved set retarding additives, set retarded hydraulic cement compositions and methods of using the compositions are provided which meet the needs described above and overcome the shortcomings of the prior art. The set retarding additives of this invention are comprised of copolymers containing monomer units formed from a first monomer selected from the group consisting of acrylic acid and methacrylic acid and a second monomer selected from the group consisting of acrylamide, methacrylamide, N,N-dimethylacrylamide, N-methylacrylamide, N-isopropylacrylamide and N-(hydroxymethyl) acrylamide. The monomer units formed from the first monomer are preferably present in the copolymers in an amount in the range of from about 10 mole % to about 55 mole % of the copolymers with the remainder comprising monomer units formed from the second monomer.

Set retarded hydraulic cement compositions including the additives of this invention and methods of using the cement compositions in the construction and repair of wells are also provided.

It is, therefore, a general object of the present invention to provide improved cement set retarding additives, set retarded cement compositions and methods of using the set retarded cement compositions in well cementing operations.

Other and further features, objects and advantages of the present invention will readily suggest themselves to those skilled in the art upon a reading of the description of preferred embodiments which follows.

DESCRIPTION OF PREFERRED EMBODIMENTS

The set retarding additives of this invention are relatively inexpensive, do not cause premature gelation and bring about predictable cement composition thickening and setting times. The additives are comprised of copolymers containing monomer units formed from a first monomer selected from the group consisting of acrylic acid and methacrylic acid and a second monomer selected from the group consisting of acrylamide, methacrylamide, N,N-dimethylacrylamide, N-methylacrylamide, N-isopropylacrylamide and N-(hydroxymethyl) acrylamide. The first monomer is preferably acrylic acid, and the second monomer is preferably selected from acrylamide and N,N-dimethylacrylamide. Generally, the set retarding copolymers of this invention contain monomer units formed from the first monomer in an amount in the range of from about 10 mole % to about 55 mole % with the remainder of the monomer units being formed from the second monomer.

The most preferred set retarding copolymer is comprised of monomer units formed from acrylic acid and monomer units formed from N,N-dimethylacrylamide, with the monomer units formed from acrylic acid being present in the copolymer in an amount in the range of from about 40 mole % to about 50 mole % of the copolymer.

The set retarding copolymers of this invention have the following general structure:

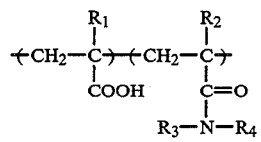

wherein: $R_1$ is selected from hydrogen or a methyl group; $R_2$ is selected from hydrogen or a methyl group; $R_3$ is selected from hydrogen, a methyl group, an isopropyl group or a hydroxymethyl group; and $R_4$ is selected from hydrogen or a methyl group.

When $R_1$ in the above structural formula is hydrogen, the first monomer is acrylic acid and when $R_1$ is a methyl group the first monomer is methacrylic acid. When the second monomer is acrylamide, $R_2$, $R_3$ and $R_4$ are all hydrogen. When the second monomer is methacrylamide, $R_2$ is a methyl group and $R_3$ and $R_4$ are each hydrogen. When the second monomer is N,N-dimethylacrylamide, $R_2$ is hydrogen and $R_3$ and $R_4$ are methyl groups. When the second monomer is N-methylacrylamide, $R_3$ is a methyl group and $R_2$ and $R_4$ are hydrogen. When the second monomer is N-isopropyl-acrylamide $R_3$ is an isopropyl group and $R_2$ and $R_4$ are hydrogen, and when the second monomer is N-(hydroxymethyl) acrylamide $R_3$ is a hydroxymethyl group ($CH_2OH$) and $R_2$ and $R_4$ are hydrogen.

In the preparation of the above described set retarding copolymers, the monomers can be polymerized in an aqueous solution using sodium persulfate and tetraethylenepentamine as an initiating system. In a typical synthesis, the monomers are dissolved in deionized water and the reaction mixture is maintained in a water bath at 60° C. Nitrogen is bubbled through the reaction mixture to eliminate any dissolved oxygen for a minimum time of 30 minutes whereupon small quantities of sodium persulfate and tetraethylenepentamine are added to the reaction mixture, and the reaction is allowed to proceed for about 4 hours. The aqueous solution containing the copolymer produced can be utilized directly as a liquid cement composition set retarding additive.

The set retarded hydraulic cement compositions of this invention are basically comprised of a hydraulic cement, sufficient water to form a slurry of the cement and a copolymer set retarding additive described above. While various hydraulic cements can be utilized in the cement compositions, Portland cement is generally preferred, and can be, for example, one or more of the various types identified as API Classes A-H and J cements. These cements are classified and defined in *API Specification for Materials and Testing for Well Cements*, API Specification 10A, 21st Edition dated Sep. 1, 1991, of the American Petroleum Institute, Washington, D.C. API Portland cements generally have a maximum particle size of about 90 microns and a specific surface (sometimes referred to as Blaine Fineness) of about 3900 square centimeters per gram. A highly useful and effective cement slurry base for use in accordance with this invention comprises API Class H Portland cement mixed with water to provide a density of from about 11.3 to about 18.0 pounds per gallon.

It is often highly advantageous to use a fine particle size hydraulic cement consisting of particles having diameters no larger than about 30 microns and having a Blaine Fineness no less than about 6000 square centimeters per gram. Preferably, the fine cement particles have diameters no larger than about 17 microns and most preferably no larger than about 11 microns. The Blaine Fineness is preferably greater than about 7000 square centimeters per gram, more preferably about 10,000 square centimeters per gram and still more preferably greater than about 13,000 square centimeters per gram. Methods of utilizing such fine particle size hydraulic cement in well completion and remedial operations are disclosed in U.S. Pat. No. 5,121,795 issued Jun. 16, 1992 and U.S. Pat. No. 5,125,455 issued Jun. 30, 1992, both of which are incorporated herein by reference.

The water used in the cement compositions of this invention can be water from any source, provided that it does not contain an excess of compounds which adversely react with or otherwise affect other components in the cement compositions. The water is present in a cement composition of this invention in an amount sufficient to form a slurry of the cement, preferably, a slurry which is readily pumpable. Generally, the water is present in the range of from about 30% to about 60% by weight of dry cement in the composition when the cement is of normal particle size. When a cement of fine particle size as described above is used, water is present in the cement composition in an amount in the range of from about 100% to about 200% by weight of dry cement in the composition, and a dispersing agent such as the dispersing agent described in U.S. Pat. No. 4,557,763 issued on Dec. 10, 1985 is generally included to facilitate the formation of the cement slurry and prevent the premature gelation thereof.

A copolymer set retarding additive as described above is included in the cement compositions of this invention in amounts sufficient to delay or retard the setting of the compositions for time periods required to place the compositions in desired locations. When the cement compositions are utilized to carry out completion, remedial and other cementing operations in subterranean zones penetrated by well bores, the compositions must remain pumpable for periods of time long enough to place them in the subterranean zones to be cemented. The thickening and set times of cement compositions are strongly dependent upon temperature, and to obtain optimum results in well applications, a quantity of a copolymer set retarding additive of this invention required to provide the necessary pumping time at the temperature to be encountered is included in a cement composition to be utilized. Such quantity can be determined in advance by performing thickening time tests of the type described in the above mentioned API Specification 10A.

Generally an aqueous solution of a set retarding copolymer of this invention which is about 10% active is combined with a cement slurry in an amount whereby the copolymer is present in the resulting set retarded cement composition in an amount in the range of from about 0.1% to about 2.0% by weight of dry cement in the composition.

A variety of other additives are often included in well cement compositions in addition to the set retarding additives. Such other additives are well known to those skilled in the art and are included in well cement compositions to vary the composition density, increase or decrease strength, control fluid loss, reduce viscosity, increase resistance to corrosive fluids and the like. Essentially, a cement composition meeting the specifications of the American Petroleum Institute is mixed with water and other additives to provide a cement slurry appropriate for the conditions existing in each individual well to be cemented.

A particularly preferred set retarded cement composition of this invention is comprised of hydraulic cement, water in an amount sufficient to form a slurry of the cement, e.g., an amount in the range of from about 30% to about 60% by weight of dry cement in the composition, and a copolymer set retarding additive present in the composition in an amount in the range of from about 0.1% to about 2.0% by weight of dry cement therein. The set retarding additive is comprised of a copolymer containing monomer units formed from a first monomer selected from acrylic acid or methacrylic acid and a second monomer selected from acrylamide, methacrylamide, N,N-dimethylacrylamide, N-methylacrylamide, N-isopropylacrylamide and N-(hydroxymethyl) acrylamide.

The methods of this invention for cementing a subterranean zone penetrated by a well bore are basically comprised of the steps of forming a pumpable set retarded cement composition of this invention, pumping the cement composition into the subterranean zone by way of the well bore, and then allowing the cement composition to set therein.

In order to further describe the additives, compositions and methods of this invention and to facilitate a clear understanding thereof, the following examples are given.

EXAMPLE 1

A first monomer comprised of acrylic acid and a second monomer comprised of N,N-dimethylacrylamide were copolymerized in an aqueous solution using sodium persulfate and tetraethylenepentamine as the initiating system. That is, 8 grams of acrylic acid and 12 grams of N,N-dimethylacrylamide were dissolved in 200 grams of deionized water. The reaction mixture was placed in a water bath and maintained at 60° C. Nitrogen was bubbled through the reaction mixture to eliminate any dissolved oxygen for about 30 minutes whereupon 0.4 grams of sodium persulfate and 0.5 milliliters of tetraethylenepentamine were added to the reaction mixture. The ensuing reaction was allowed to proceed for about 4 hours. The resulting reaction product mixture was an aqueous solution containing about 9.0% by weight of a copolymer comprised of monomer units formed from acrylic acid and N,N-dimethylacrylamide. The copolymer contained 48.2 mole % monomer units formed from acrylic acid and 51.8 mole % monomer units formed from N,N-dimethylacrylamide.

EXAMPLE 2

Various quantities of the copolymer produced as described in Example 1 above (a 9% by weight aqueous solution of the copolymer) were added to test portions of a base cement slurry. The base cement slurry was comprised of Lone Star Class H hydraulic cement and water in an amount of 3.8% by weight of dry cement. The base slurry had a density of 16.4 pounds per gallon.

The test cement composition samples containing various quantities of the set retarding copolymer were tested for thickening times at various temperatures in accordance with the standard API thickening time testing procedures set forth in the API Specification 10A referred to above. For comparison purposes, additional samples of the base cement slurry containing various quantities of a commercially available cement set retarding additive were also tested for thickening times at various temperatures. The prior art commercially available cement set retarding additive is comprised of a copolymer of AMPS ® (2-acrylamido-2-methylpropane sulfonic acid) and acrylic acid and is described in U.S. Pat. No. 5,049,288 issued Sep. 17, 1991 assigned to the Halliburton Company of Duncan, Okla. The results of these tests are set forth in Table I below.

TABLE I

| Set Retarding Additive in Cement Composition | Thickening Times of Set Retarded Cement Compositions | | | | |
|---|---|---|---|---|---|
| | Amount of Set Retarding Additive in Cement Composition, % by Weight of Dry Cement | Thickening Times, hr:min | | | |
| | | 145° F. | 200° F. | 250° F.[2] | 300° F.[2] |
| Set Retarder of this Invention | 0.2 | 3:48 | 4:25 | — | — |
| Prior Art Set Retarder | 0.2 | 2:53 | — | — | — |
| Set Retarder of this Invention | 0.3 | 7:23 | 8:49 | — | — |
| Prior Art Set Retarder | 0.3 | 5:08 | 2:55 | — | — |
| Set Retarder of this Invention | 0.5 | 8:50 | 9:35 | 3:10 | — |
| Prior Art Set Retarder | 0.5 | — | 4:45 | — | — |
| Set Retarder of this Invention | 0.75 | — | — | 5:10[1] | — |
| Prior Art Set Retarder | 0.75 | — | — | 3:10 | — |
| Set Retarder of this Invention | 1.0 | — | — | — | 3:24[1] |

[1] Base cement slurry contained water in an amount of 42% by weight of dry cement.
[2] The cement compositions tested above 200° F. included 35% silica flour by weight of cement.

It can be seen from the results set forth in Table I that the copolymer set retarding additive of this invention produces excellent thickening times at small concentrations at temperatures up to and including 300° F. Further, the copolymer set retarding additive of this invention is a stronger retarder than the commercial set retarding additive tested in that for the same amount of additive, the copolymer of the present invention gives longer thickening times. Additionally, the copolymer of the present invention can be utilized up to 300° F. whereby the commercial set retarding additive has an upper temperature limit of about 250° F.

EXAMPLE 3

The copolymer set retarding additive prepared as described in Example 1 was tested to determine if it causes gelation and was compared with the prior art commercial set retarding additive described in Example 2 above.

The two set retarding additives tested were added to samples of the base slurry described in Example 2 in varying amounts. The gelation tests consisted of API thickening time tests at 200° F. in which the viscosities of the test cement compositions were determined initially and at 25%, 50% and 75% of the total times prior to thickening. The results of these tests are given in Table II below.

TABLE II

| | | Gelation of Set Retarded Cement Compositions | | | | |
|---|---|---|---|---|---|---|
| Set Retarding Additive in Cement Composition | Amount, % by Weight of Dry Cement | Thickening Time, hr:min 200° F. | Initial Viscosity, Bc | Viscosity at 25% of Thickening Time, Bc | Viscosity at 50% of Thickening Time, Bc | Viscosity at 75% of Thickening Time, Bc |
| Copolymer of this Invention | 0.3 | 8:49 | 20 | 21 | 18 | — |
| Prior Art Retarder | 0.3 | 2:55 | 9 | 30 | 32 | 36 |
| Copolymer of this Invention | 0.5 | 9:35 | 22 | 17 | 16 | — |
| Prior Art Retarder | 0.5 | 4:45 | 14 | 25 | 46 | 52 |

From Table II it can be seen that the prior art set retarder causes gelation since the viscosity values increase over the time to thickening. The copolymer set retarding additive of this invention, on the other hand, does not cause gelation as shown by the viscosity readings remaining relatively constant during the time prior to thickening. Further, the results set forth in Table II again show that the copolymer set retarding additive of this invention is a much stronger retarder than the tested prior art additive.

EXAMPLE 4

The set retarding additive prepared in accordance with Example 1 was added in various quantities to samples of the base cement slurry described in Example 2 above. The resulting cement composition samples were tested for 24 hour compressive strengths at 230° F. and 290° F. in accordance with API Specification 10A. The results of these tests are set forth in Table III below.

TABLE III

| Compressive Strengths of Set Retarded Cement Compositions | | |
|---|---|---|
| Amount of Set Retarding Additive in Composition, % by weight | Compressive Strengths, psi | |
| of Dry Cement | 230° F. | 290° F. |
| 0.3 | 4800 | 2280 |
| 0.5 | 1657 | 2260 |

As can be seen from Table III, the compressive strengths of the cement compositions of this invention are excellent.

EXAMPLE 5

A copolymer set retarding additive comprised of monomer units formed from acrylic acid and acrylamide was prepared. That is, 8 grams of acrylic acid and 12 grams of acrylamide were dissolved in 200 grams of deionized water. The reaction mixture was placed in a water bath and maintained at 60° C. Nitrogen was bubbled through the reaction mixture to eliminate any dissolved oxygen for 30 minutes following which 0.2 grams of sodium persulfate and 0.25 milliliters of tetraethylenepentamine were added to the reaction mixture. The ensuing reaction was allowed to proceed for about 4 hours. The resulting reaction product mixture was an aqueous solution containing about 10% by weight of a copolymer comprised of 40 mole % acrylic acid monomer units and 60 mole % acrylamide monomer units.

The copolymer set retarding additive produced as described above was added to a sample of the base cement slurry described in Example 2 above in an amount of 0.5% by weight of dry cement in the slurry. The resulting set retarded cement composition was tested for thickening time at 200° F. in accordance with API Specification 10A. The result of the thickening time test was 6 hours and 14 minutes.

Thus, the present invention is well adapted to carry out the objects and attain the ends and advantages mentioned as well as those which are inherent therein. While numerous changes may be made by those skilled in the art, such changes are encompassed within the spirit of this invention as defined by the appended claims.

What is claimed is:

1. A set retarded cement composition comprised of: hydraulic cement; sufficient water to form a slurry; and a set retarding additive consisting essentially of a copolymer containing monomer units formed from a first monomer selected from the group consisting of acrylic acid and methacrylic acid, present in said copolymer in an amount in the range of from about 10 mole % to about 55 mole %, and a second monomer selected from the group consisting of acrylamide, methacrylamide, N,N-dimethylacrylamide, N-methylacrylamide, N-isopropylacrylamide and N-(hydroxymethyl) acrylamide.

2. The composition of claim 1 wherein said first monomer of said set retarding additive is acrylic acid.

3. The composition of claim 1 wherein said second monomer of said set retarding additive is selected from the group consisting of acrylamide and N,N-dimethylacrylamide.

4. The composition of claim 1 wherein said first monomer of said set retarding additive is acrylic acid, said second monomer is N,N-dimethylacrylamide and said monomer units formed from said first monomer are present in said copolymer in an amount in the range of from about 40 mole % to about 50 mole %.

5. The composition of claim 4 wherein said hydraulic cement is Portland cement.

6. The composition of claim 5 wherein said set retarder is present in said cement composition in an amount in the range of from about 0.1% to about 2.0% by weight of cement therein.

* * * * *